US012625631B2

(12) United States Patent
Thiruvengadam et al.

(10) Patent No.: US 12,625,631 B2
(45) Date of Patent: May 12, 2026

(54) PARAMETER VALUE OPTIMIZATION IN A MEMORY SUB-SYSTEM

(71) Applicant: Micron Technology, Inc., Boise, ID (US)

(72) Inventors: Aswin Thiruvengadam, Folsom, CA (US); Sundararajan Sankaranarayanan, Fremont, CA (US); Ahmet Kaya, Davis, CA (US); Josh Hieb, Boise, ID (US); Jay Sarkar, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/774,244

(22) Filed: Jul. 16, 2024

(65) Prior Publication Data

US 2025/0028466 A1      Jan. 23, 2025

Related U.S. Application Data

(60) Provisional application No. 63/527,643, filed on Jul. 19, 2023.

(51) Int. Cl.
*G06F 3/06*      (2006.01)

(52) U.S. Cl.
CPC .......... *G06F 3/0635* (2013.01); *G06F 3/0611* (2013.01); *G06F 3/0679* (2013.01)

(58) Field of Classification Search
CPC .... G06F 3/0635; G06F 3/0611; G06F 3/0679; G06F 3/0604; G06F 3/0614; G06F 3/0629; G06F 9/505; G06F 3/06
See application file for complete search history.

(56) References Cited

U.S. PATENT DOCUMENTS

| | | | | |
|---|---|---|---|---|
| 2009/0172306 | A1* | 7/2009 | Nussbaum | G06F 9/466 |
| | | | | 712/229 |
| 2019/0377508 | A1* | 12/2019 | Bahar | G06F 3/061 |
| 2022/0107818 | A1 | 4/2022 | Zeleniak et al. | |
| 2022/0236912 | A1* | 7/2022 | Zeleniak | G06F 3/0653 |
| 2023/0073239 | A1* | 3/2023 | Jang | G06F 3/061 |

* cited by examiner

*Primary Examiner* — Khoa D Doan

(74) *Attorney, Agent, or Firm* — Lowenstein Sandler LLP

(57) ABSTRACT

A processing device, operatively coupled with a memory device, determines a current workload characteristic of the memory device. The processing device further determines, by a trainable classifier processing the current workload characteristic, a first set of one or more parameter values that satisfies a threshold workload criterion associated with the memory device. The processing device further configures the firmware component of the memory device with the first set of one or more parameter values.

22 Claims, 5 Drawing Sheets

100

200

| Records 201 | Parameter Values 202 | Workload Characteristic 203 |
|---|---|---|
| 1 | Parameter Values 22a | Workload Characteristic 23a |
| 2 | Parameter Values 22b | Workload Characteristic 23b |
| 3 | Parameter Values 22c | Workload Characteristic 23c |
| 4 | Parameter Values 22d | Workload Characteristic 23d |
| 5 | Parameter Values 22e | Workload Characteristic 23e |
| 6 | Parameter Values 22f | Workload Characteristic 23f |
| 7 | Parameter Values 22g | Workload Characteristic 23g |

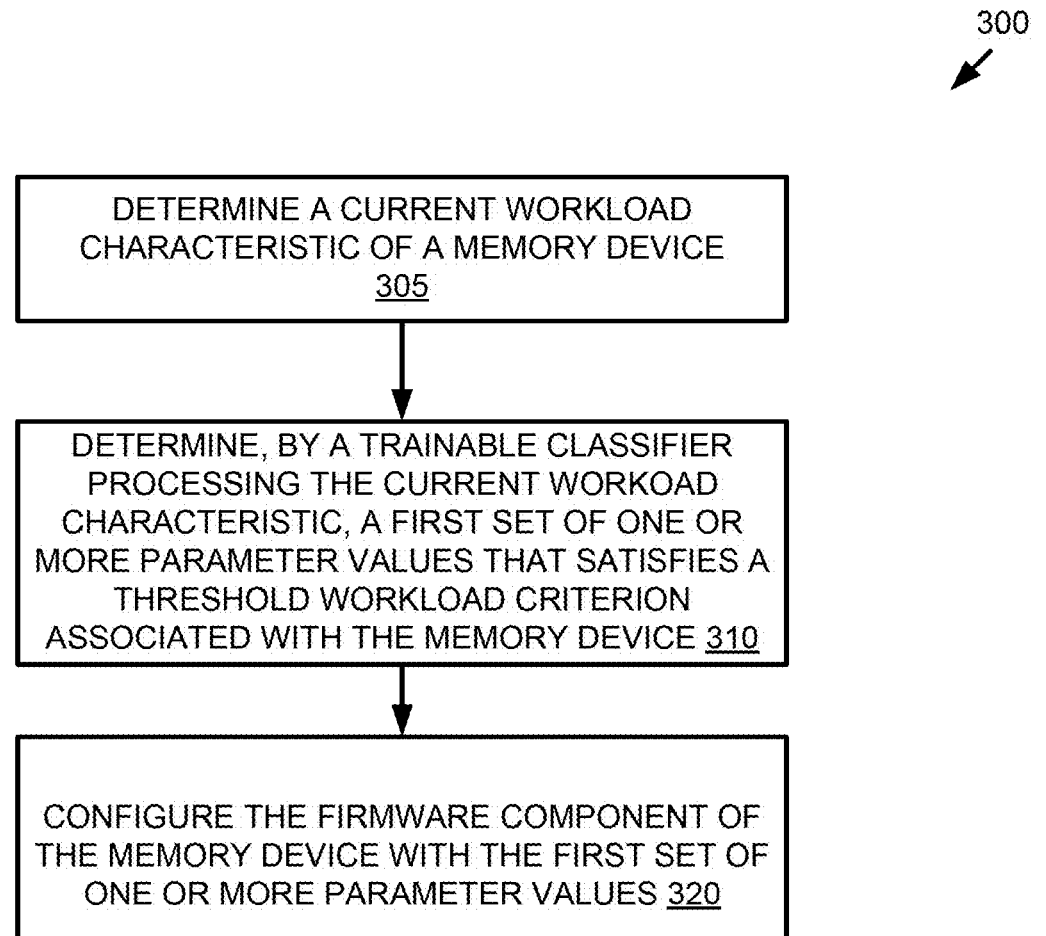

DETERMINE A CURRENT WORKLOAD
CHARACTERISTIC OF A MEMORY DEVICE
305

DETERMINE, BY A TRAINABLE CLASSIFIER
PROCESSING THE CURRENT WORKOAD
CHARACTERISTIC, A FIRST SET OF ONE OR
MORE PARAMETER VALUES THAT SATISFIES A
THRESHOLD WORKLOAD CRITERION
ASSOCIATED WITH THE MEMORY DEVICE 310

CONFIGURE THE FIRMWARE COMPONENT OF
THE MEMORY DEVICE WITH THE FIRST SET OF
ONE OR MORE PARAMETER VALUES 320

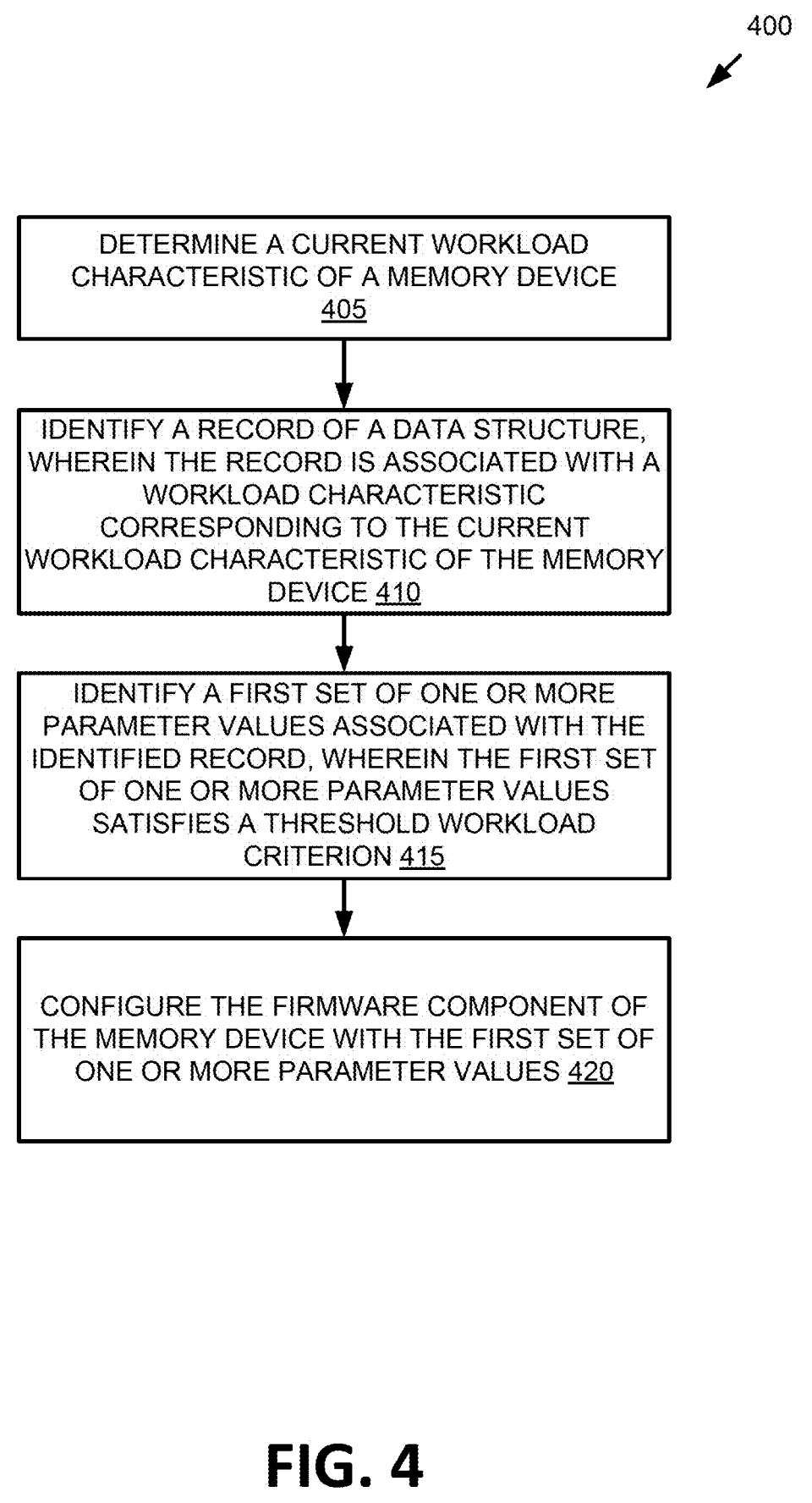

```
┌─────────────────────────────────────────────┐
│       DETERMINE A CURRENT WORKLOAD          │
│    CHARACTERISTIC OF A MEMORY DEVICE        │
│                   405                       │
└─────────────────────────────────────────────┘
                      │
                      ▼
┌─────────────────────────────────────────────┐
│   IDENTIFY A RECORD OF A DATA STRUCTURE,    │
│  WHEREIN THE RECORD IS ASSOCIATED WITH A    │
│          WORKLOAD CHARACTERISTIC            │
│    CORRESPONDING TO THE CURRENT             │
│  WORKLOAD CHARACTERISTIC OF THE MEMORY      │
│                DEVICE 410                    │
└─────────────────────────────────────────────┘
                      │
                      ▼
┌─────────────────────────────────────────────┐
│     IDENTIFY A FIRST SET OF ONE OR MORE     │
│   PARAMETER VALUES ASSOCIATED WITH THE      │
│  IDENTIFIED RECORD, WHEREIN THE FIRST SET   │
│    OF ONE OR MORE PARAMETER VALUES          │
│    SATISFIES A THRESHOLD WORKLOAD           │
│              CRITERION 415                   │
└─────────────────────────────────────────────┘
                      │
                      ▼
┌─────────────────────────────────────────────┐
│   CONFIGURE THE FIRMWARE COMPONENT OF       │
│  THE MEMORY DEVICE WITH THE FIRST SET OF    │
│  ONE OR MORE PARAMETER VALUES 420           │
│                                             │
└─────────────────────────────────────────────┘
```

FIG. 4

PARAMETER VALUE OPTIMIZATION IN A MEMORY SUB-SYSTEM

REFERENCE TO RELATED APPLICATIONS

This application claims the priority benefit of U.S. Provisional Application No. 63/527,643, filed Jul. 19, 2023, which is incorporated by reference herein.

TECHNICAL FIELD

Embodiments of the disclosure relate generally to memory sub-systems, and more specifically, relate to parameter value optimization in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 2 is a block diagram illustrating an example data structure described with reference to FIGS. 3-4, in accordance with some embodiments of the present disclosure.

FIG. 3 is a flow diagram of an example method of performing parameter value optimization in a memory sub-system, in accordance with some embodiments of the present disclosure.

FIG. 4 is a flow diagram of an example method of performing parameter value optimization in a memory sub-system, in accordance with some embodiments of the present disclosure.

DETAILED DESCRIPTION

Figure 1:
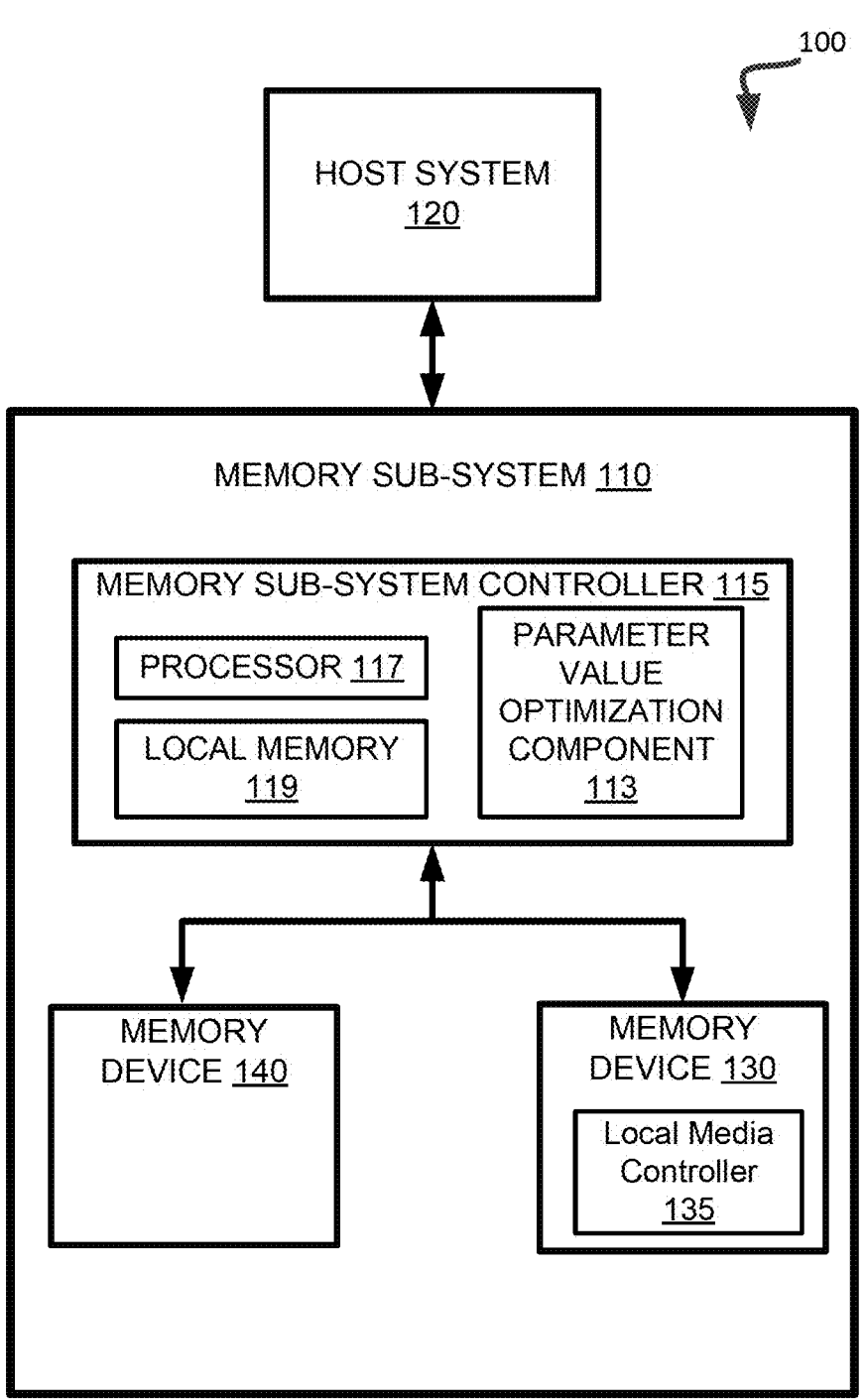
FIG. 1 illustrates an example computing system that includes a memory sub-system, in accordance with some embodiments of the present disclosure.

Aspects of the present disclosure are directed to parameter value optimization in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die includes one or more planes. For some types of non-volatile memory devices (e.g., NAND devices), each plane includes a set of physical blocks. Each block includes a set of pages. Each page includes a set of memory cells. A memory cell is an electronic circuit that stores information. Depending on the memory cell type, a memory cell can store one or more bits of binary information and has various logic states that correlate to the number of bits being stored. The logic states can be represented by binary values, such as "0" and "1", or combinations of such values.

Certain memory devices have memory device specifications set by industry standards, customer standards, device performance requirements, etc. For example, certain memory devices are to achieve certain performance metrics, such as a target read operation latency, a target write operation latency, a target read operation bandwidth, a target write operation bandwidth, etc. In order to achieve those performance metrics/device specifications, a firmware component of a memory device often uses a preconfigured set of parameter values that can impact the performance of the memory device. These parameter values can include, for example, the number of read operations performed during a program suspend and/or erase suspend operation; a number of suspend operations performed during a program and/or erase operation, etc. However, the set of parameter values can be determined during the design phase of the memory device (pre-manufacturing), where offline testing is performed (e.g., directly on the memory device or in a simulation environment) using various workload characteristics (e.g., various conditions under which a memory device operates, such as a particular number of memory access operations performed on the memory device, etc.). The set of parameter values can thus be identified for achieving the performance metrics/device specifications for the memory device operating at any of the various workload characteristics used during the design phase. However, when the memory device is running post-manufacturing, the memory device can experience workload characteristics that are different from the various workload characteristics used during the design phase. For example, the temperature of the memory device can affect workload characteristics, different uses of the memory device can be needed (e.g., a lighter workload characteristic vs. a higher workload characteristic), etc. As such, customizable parameter values that are optimized based on the current workload characteristic can be desired in order to achieve better performance and satisfy performance metrics/device requirements assigned to the memory device.

Aspects of the present disclosure address the above and other deficiencies by performing parameter value optimization in a memory sub-system. In some embodiments, a memory sub-system controller determines a current workload characteristic of a memory device (e.g., the number of memory access operations that are performed on the memory device). The memory sub-system controller can input the current workload characteristic into a trainable classifier (e.g., a machine learning model). In some embodiments, the trainable classifier can be, for example, a decision tree machine learning model, a regression machine learning model, etc. In some embodiments, the memory sub-system controller can store the trainable classifier on the memory device. The trainable classifier can generate an output. The output can be a set of parameter values that satisfies a target performance characteristic (e.g., a threshold workload criterion, which can be specified by the memory device specification). The set of parameter values can be one or more parameter values used by the memory device (e.g., by a firmware component of the memory device) to achieve the target performance characteristic. For example, the parameter values can include the number of read operations allowed during a program suspend and/or erase suspend operation, the number of suspend operations allowed during a program and/or erase operation, etc. The target performance characteristic can be the desired read and/or write operation latency, read and/or write operation bandwidth, etc. Thus, the set of parameter values can be used by the firmware component of the memory device to achieve the threshold workload criterion. The memory sub-system controller can configure the firmware component of the memory device with the set of parameter values.

In some embodiments, the memory sub-system controller can identify a record of a data structure (e.g., a look-up table) using the current workload characteristic. The data structure can have one or more records. Each record includes a set of parameter values corresponding to a particular workload characteristic, where the set of parameter values satisfies the target performance characteristic. The memory sub-system controller can store the data structure on the memory device. The memory sub-system controller can configure the firmware component of the memory device with the identified set of parameter values.

Performing parameter value optimization can result in customizable parameter values that are optimized based on the current workload characteristic, rather than using a preconfigured, constant set of parameter values that is used across various workload characteristics. By taking into account the current workload characteristic of a memory device and identifying a set of parameter values that can be used under that current workload characteristic to achieve a desired performance metric/device requirement, there can be an overall improvement in performance and quality of service (QoS) of the memory device. Further, it can help to achieve specific performance metrics/device requirements assigned to the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, the memory sub-system 110 includes a parameter value optimization component 113 that can be used to perform parameter value optimization in a memory device 130 or memory device 140. The parameter value optimization component 113 determines a current workload characteristic of a memory device (e.g., the number of memory access operations that are performed on the memory device). The parameter value optimization component 113 can input the current workload characteristic into a trainable classifier (e.g., a machine learning model). In some embodiments, the trainable classifier can be, for example, a decision tree machine learning model, a regression machine learning model, etc. In some embodiments, the parameter value optimization component 113 can store the trainable classifier on the memory device. In some embodiments, to train the classifier, subject matter experts can provide a set of features (e.g., parameter values) that can be measured on the memory device. For example, the memory device can be run with a set of known workloads (also referred to herein as workload characteristics), and the set of parameter values can be measured as the memory device is being run with each of the set of known workloads. The set of known workloads can be a read and/or write operation latency of the memory device, read and/or write operation bandwidth of the memory device, etc. A data set can be created which can store each of the measured set of parameter values as an input and each of the set of known workloads as the output. The classifier can then be trained to find (e.g., predict) a relationship between the measured set of parameter values and the set of known workloads. The classifier can be used on the memory device for classifying the workload that the memory device is currently experiencing in terms of a set of parameter values. In some embodiments, the classifier can be trained with a set of parameter values as an input and a set of optimal firmware parameter values as an output, such that the classifier can directly output the optimal parameter values for the memory device. In some embodiments, in response to inputting the current workload characteristic into the trainable classifier, the trainable classifier can generate an output. The output can be a set of parameter values that satisfies a target performance characteristic (e.g., a threshold workload criterion, which can be specified by the memory device specification). The set of parameter values can be one or more parameter values (e.g., firmware, NAND, ASIC parameter values, etc.) used by the memory device (e.g., by a firmware component of the memory device) to achieve the target performance characteristic. For example, the parameter values can include the number of read operations allowed during a program suspend and/or erase suspend operation, the number of suspend operations allowed during a program and/or erase operation, etc. The target performance characteristic can be the desired read and/or write operation latency, read and/or write operation bandwidth, etc. Thus, the set of parameter values can be used by the firmware component of the memory device to achieve the threshold workload criterion. The parameter value optimization component 113 can configure the firmware component of the memory device with the set of parameter values.

In some embodiments, the parameter value optimization component 113 can identify a record of a data structure (e.g., a look-up table) using the current workload characteristic. The data structure can have one or more records. Each record includes a set of parameter values corresponding to a particular workload characteristic, where the set of parameter values satisfies the target performance characteristic. The parameter value optimization component 113 can store the data structure on the memory device. The parameter value optimization component 113 can configure the firmware component of the memory device with the identified set of parameter values.

As an example, the current workload characteristic of the memory device can be 100,000 read operations performed on the memory device. The target performance characteristic for the memory device can be a read operation bandwidth of, for example, 5,000 MB/s (megabytes per second). The current workload characteristic of 100,000 read operations can be inputted into the trainable classifier. The trainable classifier can generate an output that is a set of parameter values that satisfy a target performance characteristic. For example, the set of parameter values can be a maximum number of read operations allowed to be performed during a program suspend operation, such as 1,000 read operations. The data structure can include a record that includes the set of parameter values generated as output from the trainable classifier (e.g., 1,000 maximum read operations allowed to be performed during a program suspend operation) and an identifier of a corresponding workload characteristic (e.g., 100,000 read operations).

Further details with regards to the operations of the parameter value optimization component 113 are described below.

FIG. 2 is a block diagram illustrating an example data structure described with reference to FIGS. 3-4, in accordance with some embodiments of the present disclosure.

FIG. 3 is a flow diagram of an example method of performing parameter value optimization in a memory subsystem, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by parameter value optimization component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 305, the processing logic determines a current workload characteristic of a memory device (e.g., the memory device 130 of FIG. 1) of the memory sub-system (e.g., the memory sub-system 110 of FIG. 1). The processing logic can measure and/or identify and/or retrieve the current workload characteristic of the memory device while the memory device is running (e.g., after manufacturing). The current workload characteristic can be the current number of memory access operations (e.g., read operations, write operations, etc.) performed on the memory device within a certain period (e.g., within a particular number of program/erase cycles and/or within a lifetime cycle of the memory device).

At block 310, the processing logic determines a set of one or more parameter values that satisfy a target performance characteristic (e.g., a threshold workload criterion). In some embodiments, the processing logic determines the set of one or more parameter values using a trainable classifier to process the current workload characteristic determined at block 305. For example, the processing logic can input the current workload characteristic into the trainable classifier. In some embodiments, the trainable classifier can be, for example, a machine learning model, such as a decision tree machine learning model, a regression machine learning model, etc. The trainable classifier can be trained such that, for each workload characteristic inputted into the trainable classifier, a set of one or more parameter values can be predicted that can be used to satisfy a target performance characteristic (e.g., a threshold workload criterion). For example, in some embodiments, to train the classifier, a set of features (e.g., parameter values) can be provided (e.g., by a subject matter expert) that can be measured on the memory device. For example, the memory device can be run with a set of known workload characteristics, and the set of parameter values can be measured as the memory device is being run with each of the set of known workload characteristics. A data set can be created which can store each of the measured set of parameter values as an input and each of the set of known workload characteristics as the output. The classifier can then be trained to find (e.g., predict) a relationship between the measured set of parameter values and the set of known workload characteristics. The classifier can then be used in the memory device for classifying the workload characteristic that the memory device is currently experiencing in terms of a set of parameter values. In some embodiments, the classifier can be trained with a set of parameter values as an input and a set of optimal firmware parameter values as an output, such that the classifier can directly output the optimal parameter values for the memory device. The processing logic can identify an output of the trainable classifier, where the output is the set of one or more parameter values. The one or more parameter values can be parameter values used by the memory device (e.g., by a firmware component of the memory device) to achieve the threshold workload criterion. For example, the one or more parameter values can include at least one of: the maximum number of read operations allowed to be performed during a program suspend and/or erase suspend operation, the maximum number of suspend operations allowed to be performed during a program and/or erase operation, a threshold time period for a completion of the program and/or erase operation, or a threshold time period for restricting the program suspend and/or erase suspend operation, etc. In some embodiments, the threshold workload criterion can be a specification for the memory device, such as a target read operation latency, a target write operation latency, a target read operation bandwidth, a target write operation bandwidth, etc.

In some embodiments, the trainable classifier can be generated during the design phase of the memory device. The processing logic can generate the trainable classifier using a simulation environment external to the memory device (e.g., an agent-based modeling simulator framework). In some embodiments, the processing logic can generate the trainable classifier directly on the memory device. In some embodiments, generating the trainable classifier can be performed using one or more workload characteristics. The one or more workload characteristics can be a number of memory access operations (e.g., read operations, write operations, etc.) to be performed on the memory device within a certain period (e.g., within a particular number of program/erase cycles and/or within a lifetime cycle of the memory device).

In some embodiments, the processing logic identifies a record of a data structure (e.g., a look-up table), such as the data structure 200 of FIG. 2, where the record includes a workload characteristic corresponding to the current workload characteristic of the memory device determined at block 305. In some embodiments, the data structure includes one or more records (e.g., the records 201 of FIG. 2). In some embodiments, the processing logic can retrieve the data structure stored on the memory device. The processing logic can identify a record of the data structure that includes another (e.g., a second) set of one or more parameter values that correspond to the current workload characteristic of the memory device. For example, the processing logic can compare the current workload characteristic to each of the workload characteristics listed in each record of the data structure. For example, using FIG. 2 as an example, the processing logic can identify that the current workload characteristic is equivalent to the workload characteristic 23b of entry 2 of the data structure 200.

In some embodiments, each record of the data structure can include a set of one or more parameter values (e.g., the parameter values 202 of FIG. 2). Each set of one or more parameter values can correspond to a particular workload characteristic. For example, parameter values 22a of record 1 of the data structure in FIG. 2 can correspond to a workload characteristic 23a. The parameter values 22a can be a set of one or more parameter values that can be used by the firmware component of the memory device to achieve a target performance characteristic (e.g., the threshold workload criterion) when the memory device is running and experiencing the current workload characteristic equivalent to the workload characteristic 23a. In some embodiments, the second set of one or more parameter values can include at least one of: the maximum number of read operations allowed to be performed during a program suspend and/or erase suspend operation, the maximum number of suspend operations allowed during a program and/or erase operation, a threshold time period for a completion of the program and/or erase operation, or a threshold time period for restricting the program suspend and/or erase suspend operation, etc. In some embodiments, the threshold workload criterion can be a specification for the memory device, such as a target read operation latency, a target write operation latency, a target read operation bandwidth, a target write operation bandwidth, etc.

In some embodiments, the data structure can be generated during the design phase of the memory device. The processing logic can generate the data structure using a simulation environment external to the memory device (e.g., an agent-based modeling simulator framework). In some embodiments, the processing logic can generate the data structure directly on the memory device. In some embodiments, generating the data structure can be performed using one or more workload characteristics. The one or more workload characteristics can be a number of memory access operations (e.g., read operations, write operations, etc.) to be performed on the memory device within a certain period (e.g., within a particular number of program/erase cycles and/or within a lifetime cycle of the memory device).

At block 320, the processing logic configures the firmware component of the memory device. In some embodiments, the processing logic configures the firmware component with the set of one or more parameter values identified at block 310 (e.g., the first set of one or more parameter values determined using the trainable classifier and/or the second set of one or more parameter values associated with the identified record of the data structure described with respect to block 310). In some embodiments, configuring the firmware component includes setting the configuration settings of the firmware component to the set of one or more parameter values, such that the firmware component uses the set of one or more parameter values to achieve the target performance characteristic.

FIG. 4 is a flow diagram of an example method of performing parameter value optimization in a memory subsystem, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by parameter value optimization component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 405, the processing logic determines a current workload characteristic of a memory device (e.g., the memory device 130 of FIG. 1) of the memory sub-system (e.g., the memory sub-system 110 of FIG. 1). The processing logic can measure and/or identify and/or retrieve the current workload characteristic of the memory device while the memory device is running (e.g., after manufacturing). The current workload characteristic can be the current number of memory access operations (e.g., read operations, write operations, etc.) being performed on the memory device within a certain period (e.g., within a particular number of program/erase cycles and/or within a lifetime cycle of the memory device).

At block 410, the processing logic identifies a record of a data structure (e.g., a look-up table), such as the data structure 200 of FIG. 2, where the record includes a workload characteristic corresponding to the current workload characteristic of the memory device determined at block 405. In some embodiments, the data structure includes one or more records (e.g., the records 201 of FIG. 2). In some embodiments, the processing logic can retrieve the data structure stored on the memory device. The processing logic can identify a record of the data structure that includes a set of one or more parameter values that correspond to the current workload characteristic of the memory device. For example, the processing logic can compare the current workload characteristic to each of the workload characteristics listed in each record of the data structure. For example, using FIG. 2 as an example, the processing logic can identify that the current workload characteristic is equivalent to the workload characteristic 23b of record 2 of the data structure 200.

In some embodiments, each record of the data structure can include a set of one or more parameter values (e.g., the parameter values 202 of FIG. 2). Each set of one or more parameter values can correspond to a particular workload characteristic. For example, parameter values 22a of record 1 of the data structure in FIG. 2 can correspond to a workload characteristic 23a. The parameter values 22a can be a set of one or more parameter values that can be used by the firmware component of the memory device to achieve a target performance characteristic (e.g., the threshold workload criterion) when the memory device is running and experiencing the current workload characteristic equivalent to the workload characteristic 23a. In some embodiments, the set of one or more parameter values can include at least one of: the maximum number of read operations allowed during a program suspend and/or erase suspend operation, the maximum number of suspend operations allowed during a program and/or erase operation, a threshold time period for a completion of the program and/or erase operation, or a threshold time period for restricting the program suspend and/or erase suspend operation, etc. In some embodiments, the threshold workload criterion can be a specification for the memory device, such as a target read operation latency, a target write operation latency, a target read operation bandwidth, a target write operation bandwidth, etc.

In some embodiments, the processing logic determines the set of one or more parameter values using a trainable classifier to process the current workload characteristic determined at block 405. For example, the processing logic can input the current workload characteristic into the trainable classifier. In some embodiments, the trainable classifier can be, for example, a machine learning model, such as a decision tree machine learning model, a regression machine learning model, etc. The trainable classifier can be trained such that, for each workload characteristic inputted into the trainable classifier, a set of one or more parameter values can be predicted that can be used to satisfy a target performance characteristic (e.g., a threshold workload criterion). For example, in some embodiments, to train the classifier, a set of features (e.g., parameter values) can be provided (e.g., by a subject matter expert) that can be measured on the memory device. For example, the memory device can be run with a set of known workload characteristics, and the set of parameter values can be measured as the memory device is being run with each of the set of known workload characteristics. A data set can be created which can store each of the measured set of parameter values as an input and each of the set of known workload characteristics as the output. The classifier can then be trained to find (e.g., predict) a relationship between the measured set of parameter values and the set of known workload characteristics. The classifier can then be used in the memory device for classifying the workload characteristic that the memory device is currently experiencing in terms of a set of parameter values. In some embodiments, the classifier can be trained with a set of parameter values as an input and a set of optimal firmware parameter values as an output, such that the classifier can directly output the optimal parameter values for the memory device.

In some embodiments, the data structure can be generated during the design phase of the memory device. The processing logic can generate the data structure using a simulation environment external to the memory device (e.g., an agent-based modeling simulator framework). In some embodiments, the processing logic can generate the data structure directly on the memory device. In some embodiments, generating the data structure can be performed using one or more workload characteristics. The one or more workload characteristics can be a number of memory access operations (e.g., read operations, write operations, etc.) to be performed on the memory device within a certain period (e.g., within a particular number of program/erase cycles and/or within a lifetime cycle of the memory device).

At block 415, the processing logic identifies a set of one or more parameter values listed within the record identified at block 410. For example, the processing logic can identify the set of one or more parameter values listed within the same record 2 of the data structure 200 (e.g., the parameter values 22b). The processing logic can use the set of one or more parameter values as the one or more parameter values that satisfy the threshold workload criterion.

At block 420, the processing logic configures the firmware component of the memory device. In some embodiments, the processing logic configures the firmware component with the set of one or more parameter values identified at operation 415. In some embodiments, configuring the firmware component includes setting the configuration settings of the firmware component to the set of one or more parameter values, such that the firmware component uses the set of one or more parameter values to achieve the target performance characteristic.

Figure 5:
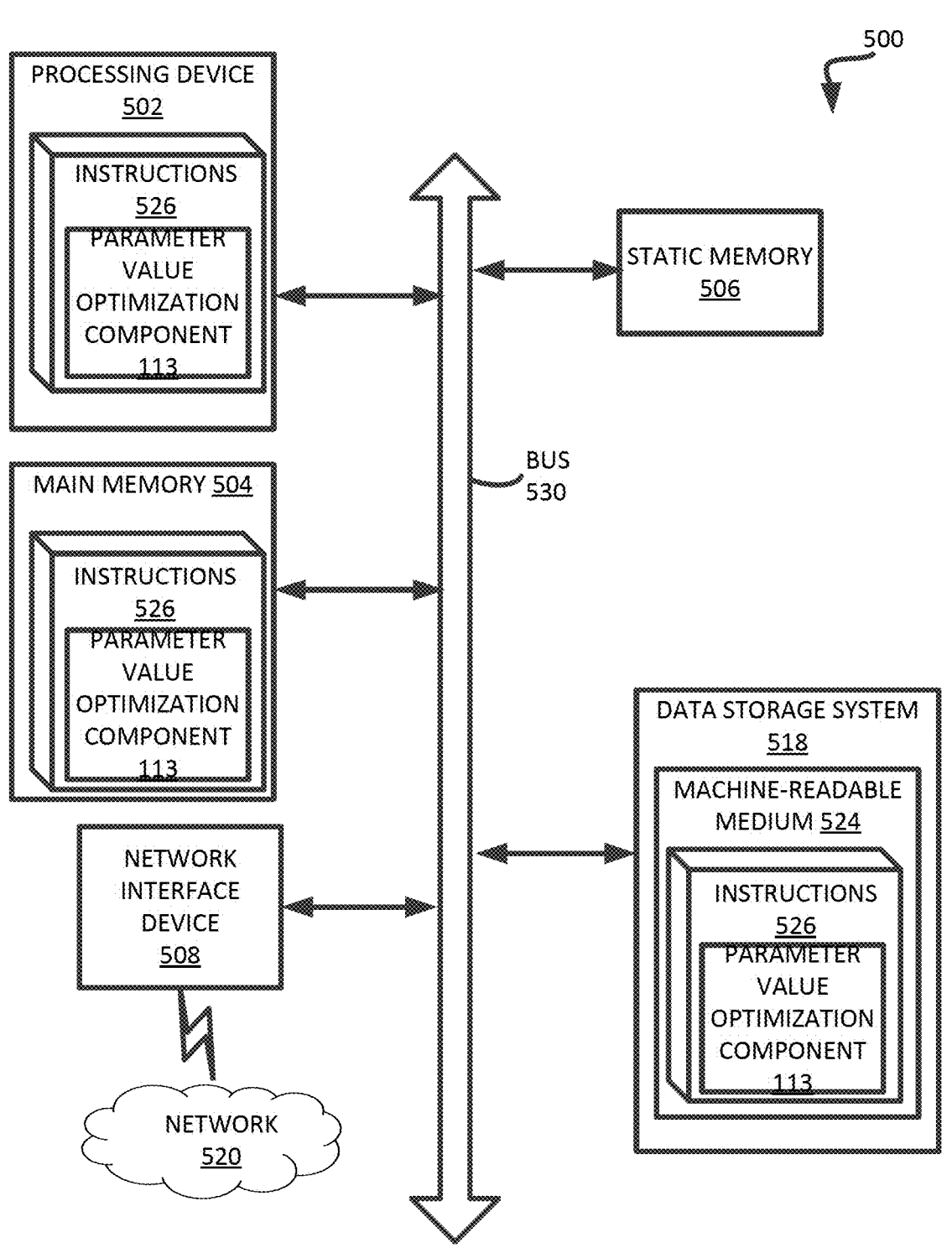
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the parameter value optimization component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to the parameter value optimization component 113 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented are not inherently related to any particular computer or other apparatus. Various general-purpose systems can be used with programs in accordance with the teachings, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:

determining a current number of memory access operations performed on the memory device;

determining, by a trainable classifier, based on the current number of memory access operations, a first set of one or more parameter values that satisfies a threshold workload criterion associated with the memory device; and configuring a firmware component of the memory device with the first set of one or more parameter values.

2. The system of claim 1, wherein the operations further comprise:

identifying a record of a data structure, wherein the record is associated with a workload characteristic corresponding to the current number of memory access operations performed on the memory device; and identifying a second set of one or more parameter values associated with the identified record, wherein the second set of one or more parameter values satisfies the threshold workload criterion.

3. The system of claim 1, wherein the threshold workload criterion comprises at least one of: a target read operation latency, a target write operation latency, a target read operation bandwidth, or a target write operation bandwidth.

4. The system of claim 1, wherein the operations further comprise:

inputting the current number of memory access operations into the trainable classifier.

5. The system of claim 1, wherein the trainable classifier comprises at least one of: a decision tree, a machine learning model, or a regression machine learning model.

6. The system of claim 1, wherein the one or more parameter values comprise a number of read operations allowed during a program suspend operation.

7. The system of claim 1, wherein the one or more parameter values comprise a number of suspend operations allowed during a program operation.

8. The system of claim 1, wherein the threshold workload criterion comprises a target performance characteristic represented by a desired memory access operation latency.

9. The system of claim 1, wherein the threshold workload criterion comprises a target performance characteristic represented by a desired memory access operation bandwidth.

10. The system of claim 1, wherein the threshold workload criterion comprises a target performance characteristic represented by a threshold time period for completing a program operation.

11. The system of claim 1, wherein the threshold workload criterion comprises a target performance characteristic represented by a threshold time period for restricting a program operation.

12. A method comprising:

determining a current number of memory access operations performed on a memory device;

determining, by a trainable classifier, based on the current number of memory access operations, a first set of one or more parameter values that satisfies a threshold workload criterion associated with the memory device; and configuring a firmware component of the memory device with the first set of one or more parameter values.

13. The method of claim 12, further comprising:

identifying a record of a data structure, wherein the record is associated with a workload characteristic corresponding to the current number of memory access operations performed on the memory device; and identifying a second set of one or more parameter values associated with the identified record, wherein the second set of one or more parameter values satisfies the threshold workload criterion.

14. The method of claim 12, further comprising:

inputting the current number of memory access operations into the trainable classifier.

15. The method of claim 12, wherein the trainable classifier comprises at least one of: a decision tree, a machine learning model, or a regression machine learning model.

16. The method of claim 12, wherein the one or more parameter values comprise one of: a number of read operations allowed during a program suspend operation or a number of suspend operations allowed during a program operation.

17. The method of claim 12, wherein the threshold workload criterion comprises a target performance characteristic represented by one of: a desired memory access operation latency, a desired memory access operation bandwidth, a threshold time period for completing a program operation, or a threshold time period for restricting a program operation.

18. A non-transitory computer-readable storage medium comprising instructions that, when executed by a processing device, cause the processing device to perform operations comprising:

determining a current number of memory access operations performed on a memory device determining, by a trainable classifier, based on the current number of memory access operations, a first set of one or more parameter values that satisfies a threshold workload criterion; and configuring a firmware component of the memory device with the first set of one or more parameter values.

19. The non-transitory computer-readable storage medium of claim 18, wherein the operations further comprise:

inputting the current number of memory access operations into the trainable classifier.

20. The non-transitory computer-readable storage medium of claim 18, wherein the trainable classifier comprises at least one of: a decision tree, a machine learning model, or a regression machine learning model.

21. The non-transitory computer-readable storage medium of claim 18, wherein the one or more parameter values comprise one of: a number of read operations allowed during a program suspend operation or a number of suspend operations allowed during a program operation.

22. The non-transitory computer-readable storage medium of claim 18, wherein the threshold workload criterion comprises a target performance characteristic represented by one of: a desired memory access operation latency, a desired memory access operation bandwidth, a threshold time period for completing a program operation, or a threshold time period for restricting a program operation.

* * * * *